Patented Jan. 1, 1952

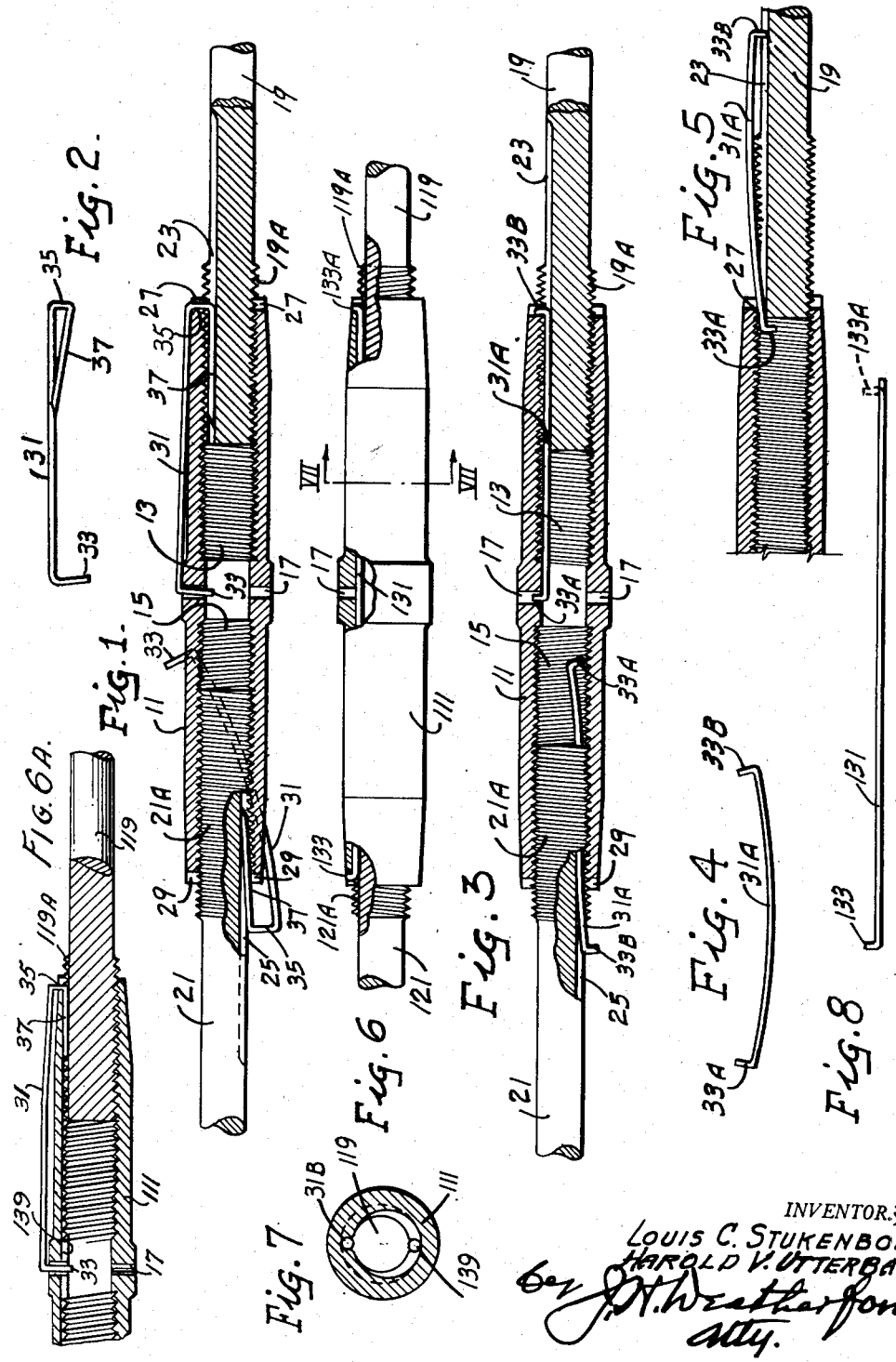

2,580,482

UNITED STATES PATENT OFFICE 2,580,482

TURNBUCKLE LOCK

Louis C. Stukenborg, Memphis, Tenn., and
Harold V. Utterback, Osyka, Miss.

Application July 12, 1945, Serial No. 604,698

18 Claims. (Cl. 287—60)

This invention relates to means for locking turnbuckles against rotation relatively to the rods onto which they are screwed and which they hold together.

Turnbuckles ordinarily join together tension rods, which are of slight diameter relatively to their length, or threaded terminals to which cables are secured. In use, these rods or cable terminals are subject to vibration, tending rapidly, or otherwise, to unscrew the turnbuckle and release the rod tension, and devices are in use for preventing such loosening.

In airplanes, cables with such terminals, or slender rods so connected are much used, these usually being of such small diameter and subject to such extreme vibration that locking becomes imperative.

In usual practice, a hole is made transversely through the turnbuckle at its center, a length of wire is extended therethrough and its opposite ends spirally and oppositely wrapped outward along the buckle and onto the rod ends, then passed through openings in the opposite rod ends, and several turns of each wire are taken around the related rod end to complete the tie. To effect adjustment of the turnbuckle the wire is removed, this being a rather tedious and by no means easy operation, and being done by unwinding, and usually because of its crimped condition from winding, cutting it from time to time to facilitate the operation, requiring a new wire for replacement, and even if not cut up, being more easily replaced by a new one.

The primary objects of the present invention are:

To provide a simple and efficient means for locking a turnbuckle against turning;

To provide locking means which may be easily loosened where adjustment of the turnbuckle is needed, and quickly refastened after adjustment; and To provide locking means which will resist strains largely in excess of those met with under substantially any conditions of use.

The means by which the foregoing and other objects are accomplished, and the manner of their accomplishment, will readily be understood from the following specification on reference to the accompanying drawings, which illustrate a typical standard turnbuckle and rod assembly, with the diameters slightly enlarged relatively to the usual turnbuckle length, and in which:

Fig. 1 is a longitudinal sectional elevation of a turnbuckle, with the rods joined thereby, partially in section, and the locking members in elevation, and respectively being placed and in place.

Fig. 2 is a side elevation of the locking member.

Fig. 3 is a sectional elevation, similar to Fig. 1, showing a modified type of locking member partially and fully in place.

Fig. 4 is a side elevation of the locking member.

Fig. 5 is a sectional elevation of fragmentary portions of a turnbuckle and rod and showing initial stage of application of the modified type of locking member.

Fig. 6 is a side elevation of a turnbuckle and rod ends partially in section, disclosing a modification of the rod end grooving, complementary turnbuckle grooving, and a further modified type of locking member.

Fig. 6A is a side elevation of a portion of a turnbuckle and one rod end partially in section, of the type shown in Fig. 6, with a locking member of the type shown in Fig. 2, inserted.

Fig. 7 is a sectional elevation slightly enlarged, taken on the line VII—VII of Fig. 6.

Fig. 8 is a side elevation of the locking member.

Referring now to the drawings in which the various parts are indicated by numerals:

11 is a turnbuckle sleeve, provided interiorly at its opposite ends with right and left hand threads 13 and 15, the exterior of the turnbuckle being here shown as of circular cross section with the center diameter somewhat larger than the ends. In the center the turnbuckle has the usual hole 17 extending diametrically therethrough, which hole may be engaged by a spanner wrench.

Engaging the opposite ends of the turnbuckle are the ends of the usual rods, or rod-like cable terminals, 19, 21, which respectively have right and left hand threads 19A, 21A for engagement with the threads of the turnbuckle, and both turnbuckle and rod ends being typical of well known and standardized forms.

In accordance with the preferable form of the present invention, the threaded portions and shanks of the rods are provided with longitudinal grooves 23 and 25 respectively, cutting through the threads and into the shanks, the depth and width of the grooves being sufficient to house the locking portions of the locking members below the thread bottoms, and the ends of the turnbuckle are provided with diametrical grooves 27 and 29, of comparable width with the grooves of the rods, for engagement also with the locking members, these turnbuckle grooves being preferably longitudinally alined with the opposite ends of the hole 17.

Two locking members, preferably identical, are used. In preferred form, Figs. 1 and 2, these members are of resilient wire of size to lie loosely in the grooves of the rod ends, and each comprises a stem portion 31 of length to span from the hole 17 to and end groove 27 or 29 of the turnbuckle. At one end of the stem, the wire is bent at right angles to form an anchor lug 33, and the opposite end is bent in the same direction from the stem and in the same plane into U shape to embrace the notched end of the turnbuckle, the U having a notch engaging locking portion 35 and a groove-engaging holding leg 37. The leg 37 is preferably converged toward the stem 31 so that when in place the stem will be held against the turnbuckle and the stem is also curved toward the leg side to insure firm engagement of the anchor lug 33 in the hole 17.

Figs. 3, 4 and 5, show an alternate form of the locking members. In these views the turnbuckle and rods are identical with those above described and are identically numbered. The locking members each comprise a stem portion 31A, as before, of length to span from the hole 17 to the end grooves 27 or 29 of the turnbuckle. At its opposite ends this stem is bent at right angles to form anchor and locking lugs 33A, 33B, preferably identical, and both on the same side of the stem. The stem is bowed outward oppositely to the lugs, to insure seating of the anchor. The lugs are of such length that when in place they will not project beyond the outer surface of the turnbuckle.

In Figs. 6, 7 and 8, a further modification is shown in which a single locking member is used, the locking member comprising a stem 131, having initially a lug 133 on one end only, the stem being long enough to span from end to end of the turnbuckle and to provide for an additional lug 133A to be bent upward after insertion.

Figs. 6 and 7 also show a modification of the grooving of the rod ends and grooving of the turnbuckle, which, though shown in connection with the single locking member 131, is equally applicable to locking members of the type shown in Fig. 2, such engagement being shown in Fig. 6A.

In these figures, the threaded portion 119A, 121A of the rod ends 119, 121 are grooved to the depth of the threads only, and a complementary groove, or grooves, 139 is cut in the threads of the turnbuckle. In this form, the ends of the turnbuckle, though shown grooved, may be smooth as the internal groove assumes the function and purpose of the end grooves.

In use, the rod ends are engaged with the turnbuckle sleeve and tightened in usual manner. If that form of the device which is shown in Figs. 3, 4 and 5 is used, it is necessary to place the locking members 31A on the rod ends, as shown in Fig. 5, before effecting the rod end engagements with the turnbuckle, but thereafter tightening of the turnbuckle is carried on in usual manner and until the desired tension is effected.

After tightening, each rod end is adjusted individually with reference to the turnbuckle until its groove, as the groove 25, Fig. 1, is alined with one of the two end grooves 29 in that end of the turnbuckle, or as in Fig. 6A, the groove of the rod and a groove of the related end of the turnbuckle sleeve are alined. The holding leg 37 of the locking member is engaged in the groove of the rod, Fig. 1, or the alined grooves of the rod and turnbuckle sleeve, Fig. 6A, and the locking member moved into place until the notch engaging locking portion 35 seats in the turnbuckle groove 29, the stem 31 of the locking member at such time lying alongside the turnbuckle. After this seating the anchor lug end 33 is sprung outward and moved over into alinement with the hole 17 and allowed to spring back thereinto to complete the engagement. The opposite rod end is similarly locked, completing the installation.

In the form shown in Fig. 3, the locking lug 33B, which, Fig. 5, initially and during tightening of the turnbuckle, lies in the groove 23, is subsequently turned to face outward, with reference to the rod end 21, as shown in Fig. 3, and the locking member is pushed longitudinally until the locking lug 33B engages in the groove 29 and the anchor lug 33A engages in the hole 17 in the turnbuckle, completing the installation.

In both these cases the anchor lug 33, or 33A holds the locking member against longitudinal displacement and the groove engaging locking portion 35, or the groove engaging locking lug 33B, as the case may be, effects a positive lock against turning of the turnbuckle with respect to the rod end and one which can only be dislodged by the shearing of such portion or lug.

In the form shown in Fig. 6, after the groove of one rod has been alined with the groove in the turnbuckle sleeve the straight end of the locking member 131 is inserted in the grooves and moved until it comes against the end of the opposite rod. The groove in this second rod is then alined with the same groove in the turnbuckle and the locking member further inserted until the anchor lug 133 seats against the end of the turnbuckle, or in the groove in such end, if notched, and the opposite end of the locking member is outwardly bent to form a second anchor lug 133A.

In this form of the device, the stem of the locking member acts as a key to prevent relative turning of the rod ends and the turnbuckle and must accomplish the destruction of the threads before relative turning of the sleeve and rod end can occur.

It will readily be seen that if it be so desired, the locking member shown in Fig. 2 may be used instead of the single locking member 131, the holding leg 37 effecting the locking.

While one locking member is shown above and one below the rods in Figs. 1 and 3, the hole 17 is usually of such size that it will hold the retaining lugs of both locking members and both thereof may, therefore, be on the same side of the rods.

We claim:

1. A turnbuckle assembly, comprising an internally threaded sleeve, rods having threaded end portions joined thereby, and locking members; said rods each having a longitudinal member-housing groove in its threaded portion, and said sleeve being apertured intermediate its length, and having end portions having grooves complementary to said rod grooves, each said locking member comprising a resilient wire having a stem portion, of length to span from said sleeve aperture to an end of said sleeve, said wire having at one end an anchor lug for engagement with said sleeve aperture and an opposite end portion bent to interengage a groove of said sleeve and the complementary groove of a rod end.

2. A turnbuckle assembly comprising an internally threaded sleeve, rods having threaded end portions joined thereby, and locking members; said rods each having a longitudinal member-housing groove in its threaded portion, and said sleeve being apertured intermediate its length, and having end portions having grooves complementary to said rod grooves, each said locking member comprising a resilient wire having a stem portion, of length to span from said sleeve aperture to an end of said sleeve, and lying along said sleeve, said stem having at one end an inwardly bent anchor lug engaging with said sleeve aperture and at its opposite end an inwardly and rearwardly bent end portion embracing said sleeve end and inter-engaging said sleeve and rod end grooves.

3. A turnbuckle assembly, including an internally threaded sleeve, rods having threaded end portions joined thereby, and locking members; said rods each having a longitudinal groove in its threaded portion, and said sleeve having a hole at its longitudinal center, and longitudinal grooves in said internal threads, each respectively cooperating with a said rod groove to receive a said locking member, each said locking member comprising a resilient wire having a stem portion, of length to span from said sleeve hole to an end of said sleeve, said stem having one end bent to form an anchor lug for engagement with said sleeve hole and its opposite end portion bent to embrace an end of said sleeve and continue reversely in locking engagement in said rod and sleeve grooves.

4. A turnbuckle assembly comprising an internally threaded sleeve, rods having threaded end portions joined thereby, and locking members; said rods each having a longitudinal member-housing groove in its threaded portion, and said sleeve having a hole at its longitudinal center, and an end groove, each said locking member comprising a resilient wire having a stem portion, of length to span from said sleeve hole to an end of said sleeve, and lying along said sleeve, said stem having at one end an inwardly bent anchor lug engaging with said sleeve hole and at its opposite end an inwardly and rearwardly bent end portion engaging a sleeve end groove, and a rod end groove within said sleeve end.

5. A turnbuckle assembly which includes an internally threaded sleeve and threaded rods engaged respectively with opposite ends of said sleeve, said rods having longitudinal grooves therein and said sleeve having complementary grooves registerable with said rod grooves by relative turning movement of said rods and sleeve, and locking means including locking portions longitudinally engageable with said rod and sleeve grooves to prevent said turning movements, and sleeve engaging portions resisting longitudinal displacement.

6. A turnbuckle assembly which includes an internally threaded sleeve and threaded rods engaged respectively within opposite end portions of said sleeve, said rods having longitudinal grooves therein and said sleeve having complementary grooves registerable with said rod grooves by relative turning movement of said rods and sleeves; and wire-like locking means including longitudinal portions and integral portions substantially at right angles thereto, interengaging said grooves, when in register, to prevent relative turning movements of said rods and sleeve, and engaging said sleeve to prevent longitudinal displacement relatively thereto.

7. A turnbuckle assembly in accordance with claim 6, in which the threaded portions of said sleeve and rods are longitudinally grooved to jointly receive said locking means and said locking means is a single length of wire disposed in said grooves and has end portions bent substantially at right angles to embrace the ends of the sleeve.

8. A turnbuckle assembly in accordance with claim 6, in which said sleeve is centrally apertured, and its ends radially notched to form said sleeve grooves, and said locking means includes two members each having a longitudinal rod groove engaging portion and outwardly bent sleeve notch and aperture engaging end portions.

9. A turnbuckle assembly in accordance with claim 6, in which said sleeve is apertured and its ends radially notched to form said sleeve grooves, and said locking means includes two members, each member including a longitudinal stem portion having at one end an inwardly bent anchor lug portion and at its opposite end an inwardly bent and reversely continued locking portion, said lug portion engaging said sleeve aperture, said stem portion extending therefrom along and exterior to said sleeve to an end thereof, and said locking portion engaging the notch of said sleeve end, and the related said rod groove within said sleeve.

10. A locking member adapted for use with a turnbuckle assembly, including longitudinally grooved rods, and a sleeve having complementary locking grooves and an anchor lug receiving hole; said member consisting of a single length of resilient wire of size adapted for engagement in said grooves and said hole, and including a stem portion having a minor end portion bent substantially at right angles to form a hole engaging anchor lug, and a relatively major opposite end portion U-bent and extending reversely along a substantial extent of said stem portion to form a groove engaging locking portion, said end portions extending from the same side of said stem portion.

11. A locking member adapted for use with a turnbuckle assembly including longitudinally grooved rods, and a sleeve having complementary locking grooves and an anchor lug receiving hole; said member consisting of a single length of resilient wire of size adapted for engagement in said grooves and said hole, and including a stem portion having a minor end portion bent substantially at right angles to form a hole engaging anchor lug and a relatively major opposite end portion U-bent and extending reversely along a substantial extent of said stem portion to form a groove engaging locking portion, said end portions extending from the same side of said stem portion, and said major end portion converging from the U-bend thereof toward said stem.

12. A locking member adapted for use with a turnbuckle assembly having complementary locking grooves and an anchor lug receiving hole; said member consisting of a single length of resilient wire of size adapted for engagement in said grooves and said hole, and including a stem portion having a minor end portion bent substantially at right angles to form a hole engaging anchor lug and a relatively major opposite end portion U-bent and extending reversely along a substantial extent of said stem portion to form a groove engaging locking portion, said end portions extending from the same side of said stem portion, and said major end portion converging from the U-bend therein substantially into contact with said stem portion.

13. A locking member adapted for use with a turnbuckle assembly having complementary locking grooves and an anchor lug receiving hole;

said member consisting of a single length of resilient wire of size adapted for engagement in said grooves and said hole, and including a stem portion having a minor end portion bent substantially at right angles to form a hole engaging anchor lug, and a relatively major opposite end portion U-bent and extending reversely along a substantial extent of said stem portion to form a groove engaging locking portion, said end portions extending from the same side of said stem portion, and said major end portion converging from the U-bend therein into overlying relation with said stem portion.

14. A turnbuckle assembly including an internally threaded sleeve, and threaded rods engaged therewith; said sleeve being apertured intermediate its length, each said rod having a longitudinal groove therein, and said sleeve having grooves complementary to said rod grooves, for registration therewith by turning movement of said rods relatively to said sleeve; and wire-like locking means having longitudinal portions engaging said rod grooves, and angularly bent end portions, respectively engaging said sleeve grooves to prevent relative rotation of said sleeve and rods, and said sleeve aperture to prevent longitudinal displacement of said locking means.

15. A turnbuckle assembly including an internally threaded sleeve, threaded rods engaged therewith, and wire-like locking members; each said rod having a longitudinal groove therein, said sleeve being apertured intermediate its length, and having radial end grooves complementary to said rod. grooves, and registerable therewith by turning movement of said rods relatively to said sleeve; said wire-like locking members each having longitudinal portions, respectively housed in the groove of a said rod and lying exteriorly along the sleeve portion engaged by said rod; said portions having an angularly bent interconnecting end portion engaging the complementary end groove of said sleeve portion to prevent relative rotation of said sleeve and said rod; and said exteriorly lying portion having an angularly bent anchor portion engaging said sleeve aperture.

16. A turnbuckle assembly including an internally threaded sleeve, threaded rods engaged therewith, and wire-like locking members; each said rod having a longitudinal groove therein of depth to house a said locking member, said sleeve being apertured intermediate its length, and having radial end grooves complementary to said rod grooves, and registerable therewith by turning movement of said rods relatively to said sleeve; said wire-like locking members each having longitudinal portions, respectively housed in the groove of a said rod and lying exteriorly along the sleeve portion engaged by said rod; said portions having an angularly bent interconnecting end portion engaging the complementary end groove of said sleeve portion to prevent relative rotation of said sleeve and said rod; and said exteriorly lying portion having an angularly bent anchor portion engaging said sleeve aperture.

17. The combination with a turnbuckle assembly including a sleeve having a transverse centrally disposed hole and end notches, of locking members adapted for retaining engagement with said sleeve, said members each consisting of a single length of resilient wire bent to form a stem, and opposite end portions of relatively minor lengths extending from the same side of said stem, one of said end portions being U bent and the other thereof bent at right angles, said U bend being adapted for engagement with said end notch and said right angle bend for anchoring engagement in said hole, said stem between said end portions having a length equal to the distance between the proximate portions of said hole and either of said notches.

18. Locking members adapted for retaining engagement with a turnbuckle sleeve having a transverse central hole and end notches; said members each consisting of a single length of resilient wire bent to form a stem and opposite end portions of relatively minor length extending from the same side of said stem, one of said end portions being U bent and the other thereof bent at right angles, said U bend being adapted for engagement with the slotted end of said sleeve and said right angle bend for anchoring engagement in said hole, said stem between said end portions having a length equal to the distance between the proximate portions of said hole and either of said notches.

LOUIS C. STUKENBORG.
HAROLD V. UTTERBACK.

REFERENCES CITED

The following references are of record in the file of this patent:

UNITED STATES PATENTS

| Number | Name | Date |
|---|---|---|
| 605,811 | Benton | June 14, 1898 |
| 859,789 | Vaughn | July 8, 1907 |
| 1,036,991 | Fox | Aug. 27, 1912 |
| 1,364,298 | Nies | Jan. 4, 1921 |
| 1,379,394 | Cocks | May 24, 1921 |